US007641037B2

(12) United States Patent
Nireki

(10) Patent No.: US 7,641,037 B2
(45) Date of Patent: Jan. 5, 2010

(54) BILL HANDLING APPARATUS

(75) Inventor: Takao Nireki, Tokyo (JP)

(73) Assignees: Aruze Corp., Tokyo (JP); Seta Corp., Tokyo (JP)

( * ) Notice: Subject to any disclaimer, the term of this patent is extended or adjusted under 35 U.S.C. 154(b) by 124 days.

(21) Appl. No.: 11/839,787

(22) Filed: Aug. 16, 2007

(65) Prior Publication Data

US 2008/0217135 A1 Sep. 11, 2008

(30) Foreign Application Priority Data

Aug. 22, 2006 (JP) ............................ 2006-225750

(51) Int. Cl.
*G07F 7/04* (2006.01)
*G06K 7/00* (2006.01)
*G06K 9/00* (2006.01)
*G07D 7/00* (2006.01)

(52) U.S. Cl. ........................ 194/207; 194/206; 382/135

(58) Field of Classification Search ................. 194/206, 194/207; 209/534; 382/135

See application file for complete search history.

(56) References Cited

U.S. PATENT DOCUMENTS

| | | | | |
|---|---|---|---|---|
| 5,777,610 | A | 7/1998 | Sugimoto et al. | |
| 5,964,336 | A | 10/1999 | Itako et al. | |
| 5,993,093 | A | 11/1999 | Schoennauer et al. | |
| 2002/0108891 | A1* | 8/2002 | Dunlop et al. | 209/534 |
| 2008/0047802 | A1* | 2/2008 | Nireki | 194/302 |
| 2008/0048017 | A1* | 2/2008 | Nireki | 232/1 D |
| 2008/0217135 | A1* | 9/2008 | Nireki | 194/207 |

FOREIGN PATENT DOCUMENTS

| | | | |
|---|---|---|---|
| EP | 0 762 344 | A1 | 3/1997 |
| JP | 10-31774 | | 2/1998 |
| JP | 2000331730 | A * | 11/2000 |
| JP | 2006-130229 | | 5/2006 |

OTHER PUBLICATIONS

Derwent Translation (partial) for JP2000331730A.*
U.S. Appl. No. 11/839,818, filed Aug. 16, 2007, Nireki.
U.S. Appl. No. 11/839,883, filed Aug. 16, 2007, Nireki.

* cited by examiner

*Primary Examiner*—Jeffrey A Shapiro
(74) *Attorney, Agent, or Firm*—Oblon, Spivak, McClelland, Maier & Neustadt, L.L.P.

(57) ABSTRACT

A bill handling apparatus according to one embodiment of the invention has a bill insertion slot into which a bill is inserted, a bill feeding mechanism for feeding the bill inserted from the bill insertion slot, a sensor for reading the fed bill, and a bill identifying section for identifying authentication of the bill read by the sensor, a sensor board on which the sensor is installed, and a control board for controlling each operation of the bill feeding mechanism, the sensor and the bill identifying section. The bill handling apparatus further has a first connector installed on the sensor board, and a second connector installed on the control board, and the first connector and the second connector are fitted with each other for electrical continuity.

1 Claim, 11 Drawing Sheets

BILL HANDLING APPARATUS

The present disclosure relates to subject matter contained in Japanese Patent Application No. 2006-225750 filed on Aug. 22, 2006, which is expressly incorporated herein by reference in its entireties.

BACKGROUND OF THE INVENTION

The present invention relates to a bill handling apparatus for feeding a bill inserted from a bill insertion slot, while reading the fed bill to identify the validity.

Generally, a bill handling apparatus identifies the validity of a bill inserted from a bill insertion slot by a user, and is incorporated into service apparatuses that provides various kinds of products and service corresponding to the bill value judged as being valid, such as, for example, a game media lending machine installed in a game hole, or an automatic dispenser, ticket-vending machine and the like installed in public areas.

The bill handling apparatus is usually provided with operation devices such as a bill feeding mechanism that feeds a bill inserted into a bill insertion slot, bill reading means for executing readout of the fed bill, bill identifying means for identifying the validity (also referred to as authentication judgment) from the read bill information and the like, and control means for driving and controlling the operation devices.

The above-mentioned bill reading means is provided with a photosensor which applies light to the fed bill and detects the reflected light and/or transmitted light, and the bill identifying means compares a detection signal from the photosensor with beforehand stored authorized bill data to identify the validity. For the above-mentioned photosensor, as disclosed in Japanese Laid-Open Patent Publication No. H10-31774, it is known that the sensor unit is configured as a unit, and that the sensor unit is electrically connected to a connector on a control board side via a relay harness. In other words, by such a configuration, it is possible to perform maintenance operation with ease in the event of failure and like, and to cope with bogus bills simply by exchanging only the sensor unit and a microchip computer on the control board side.

As described above, since the conventional bill handling apparatus uses the relay harness and connector in connection between the sensor unit and control board, a problem easily occurs that the relay harness comes into contact with the control board or another component and causes a short and the like.

Therefore, to avoid such a problem, the necessity arises for providing footprints of the sensor unit and control board with margins, but as a result, another problem occurs that the entire bill handling apparatus is increased in size.

Accordingly, a bill handling apparatus is required that enables miniaturization of the entire apparatus.

BRIEF SUMMARY OF THE INVENTION

To achieve the above-mentioned object, a bill handling apparatus according to the present invention is characterized by having a bill insertion slot into which a bill is inserted, a bill feeding mechanism for feeding the bill inserted from the bill insertion slot, a sensor for reading the fed bill, and a bill identifying section for identifying authentication of the bill read by the sensor, and further comprising a sensor board on which the sensor is installed, a control board for controlling each operation of the bill feeding mechanism, the sensor and the bill identifying section, a first connector installed on the sensor board, and a second connector installed on the control board, where the first connector and the second connector are fitted with each other for electrical continuity.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the invention will be described below with reference to accompanying drawings.

Figure 1:
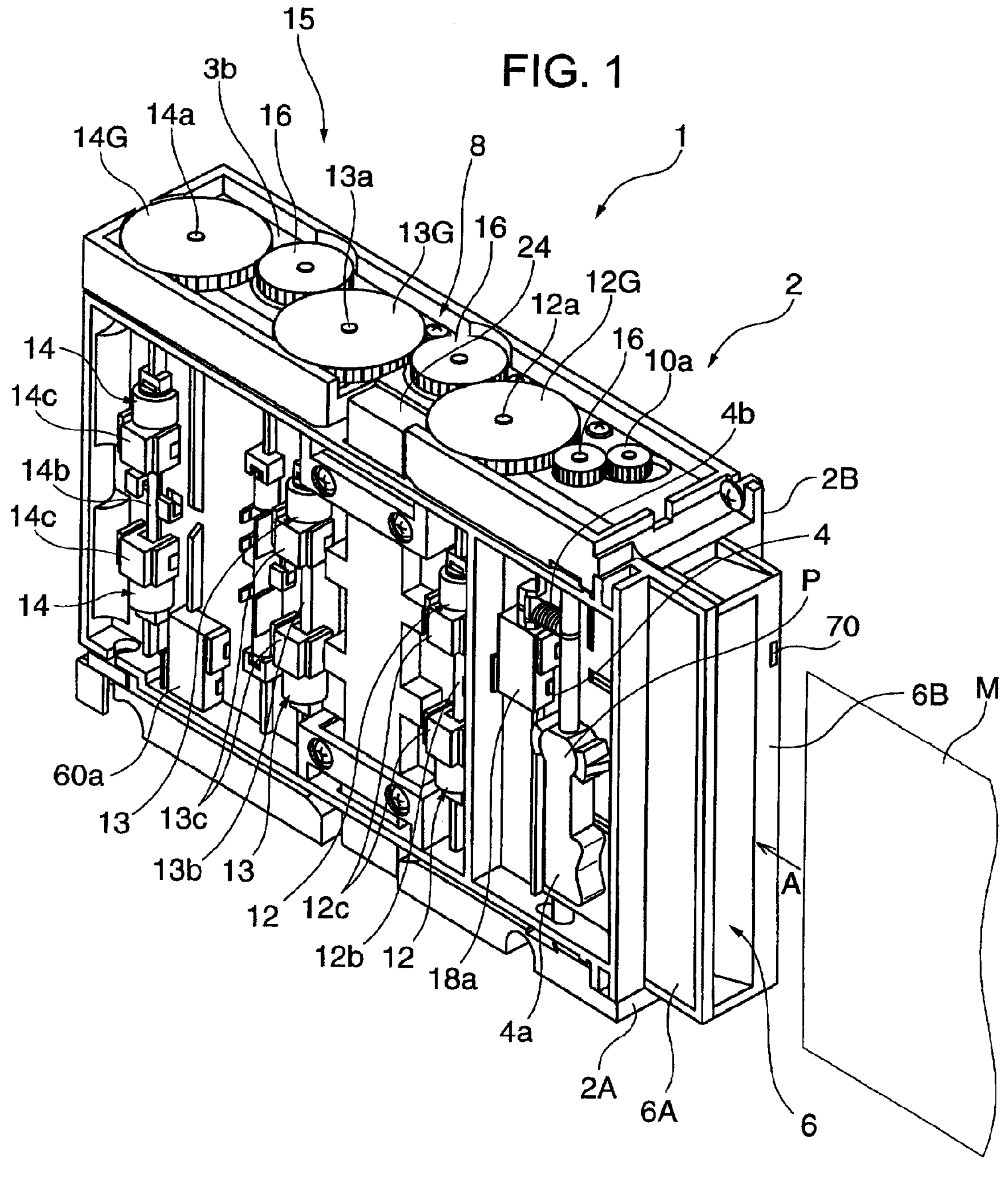
FIG. 1 is a perspective view showing an entire configuration of one embodiment of a bill handling apparatus according to the invention.
Figure 2:
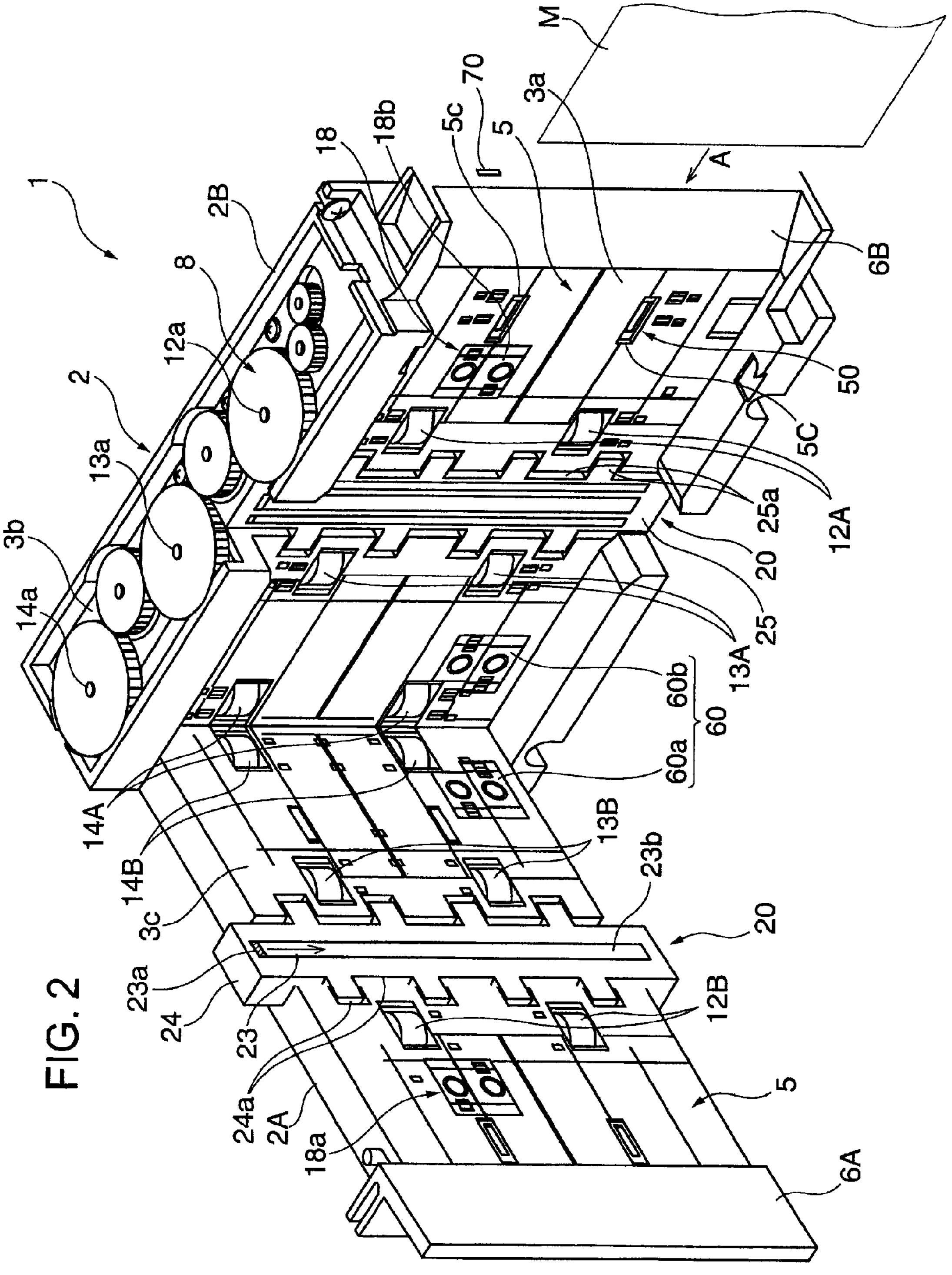
FIG. 2 is a perspective view showing a state where an upper frame is opened with respect to a lower frame.
Figure 3:
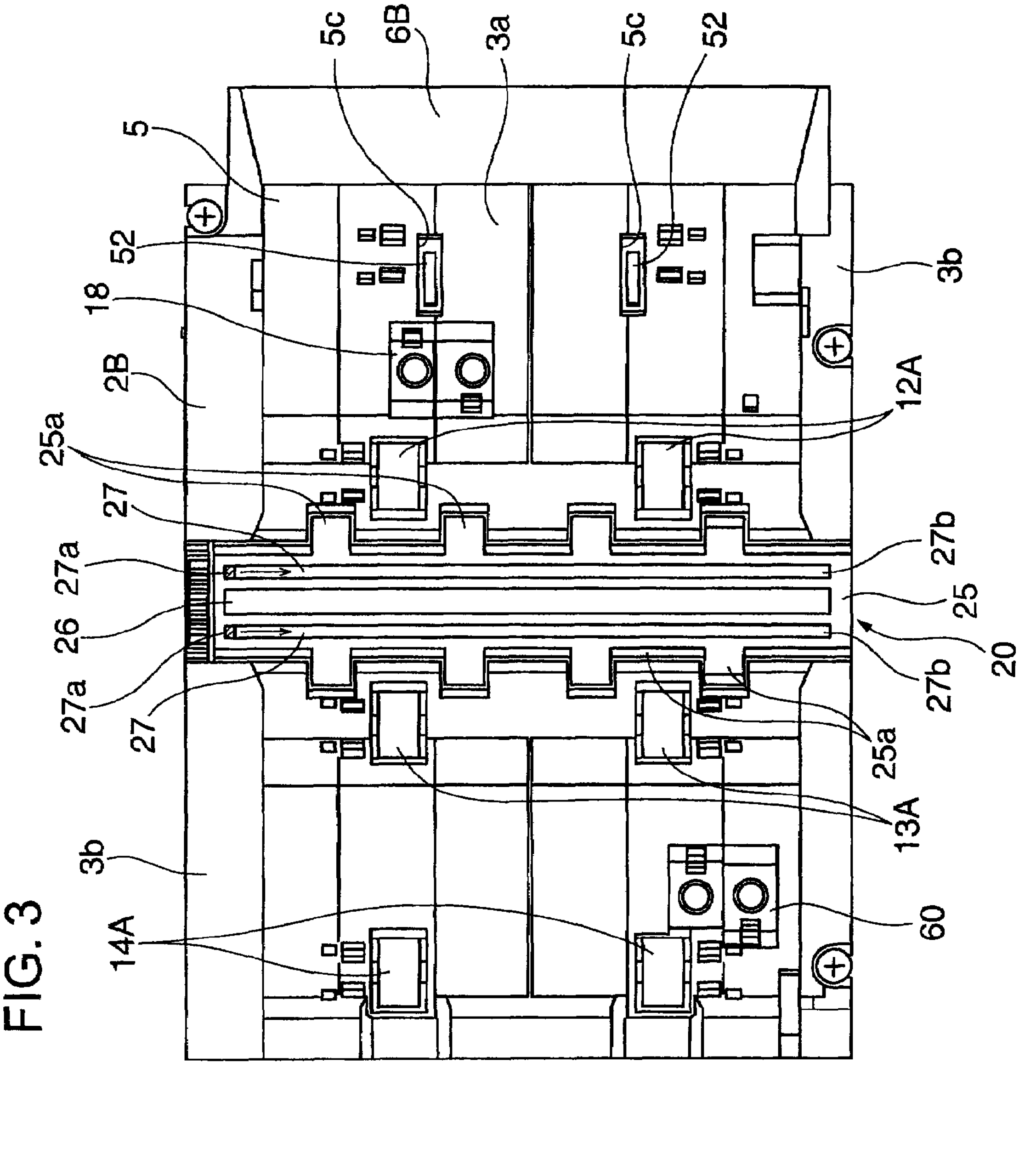
FIG. 3 is a plan view showing a bill feeding path portion of the lower frame.
Figure 4:
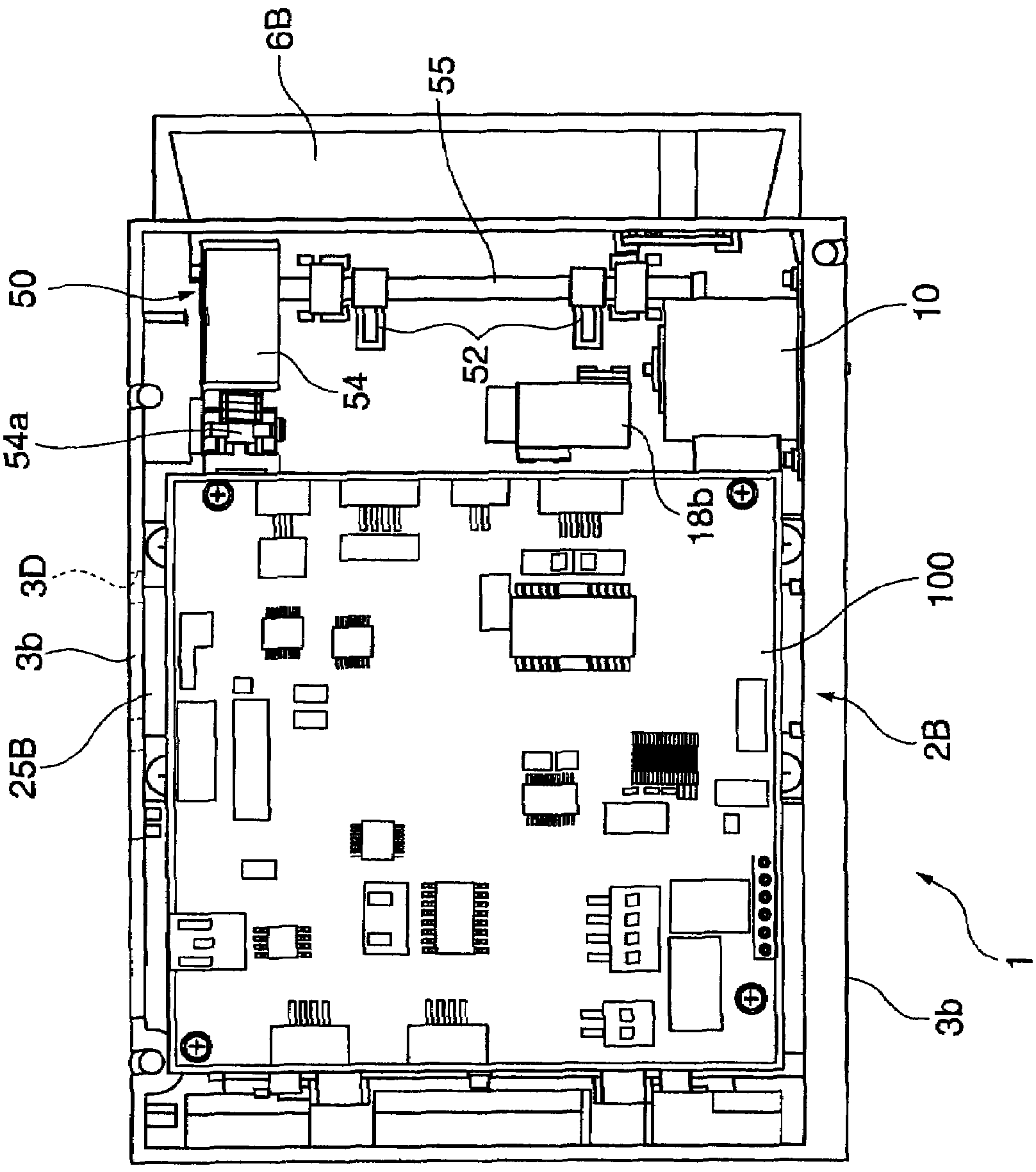
FIG. 4 is a rear elevational view of the lower frame.
Figure 5:
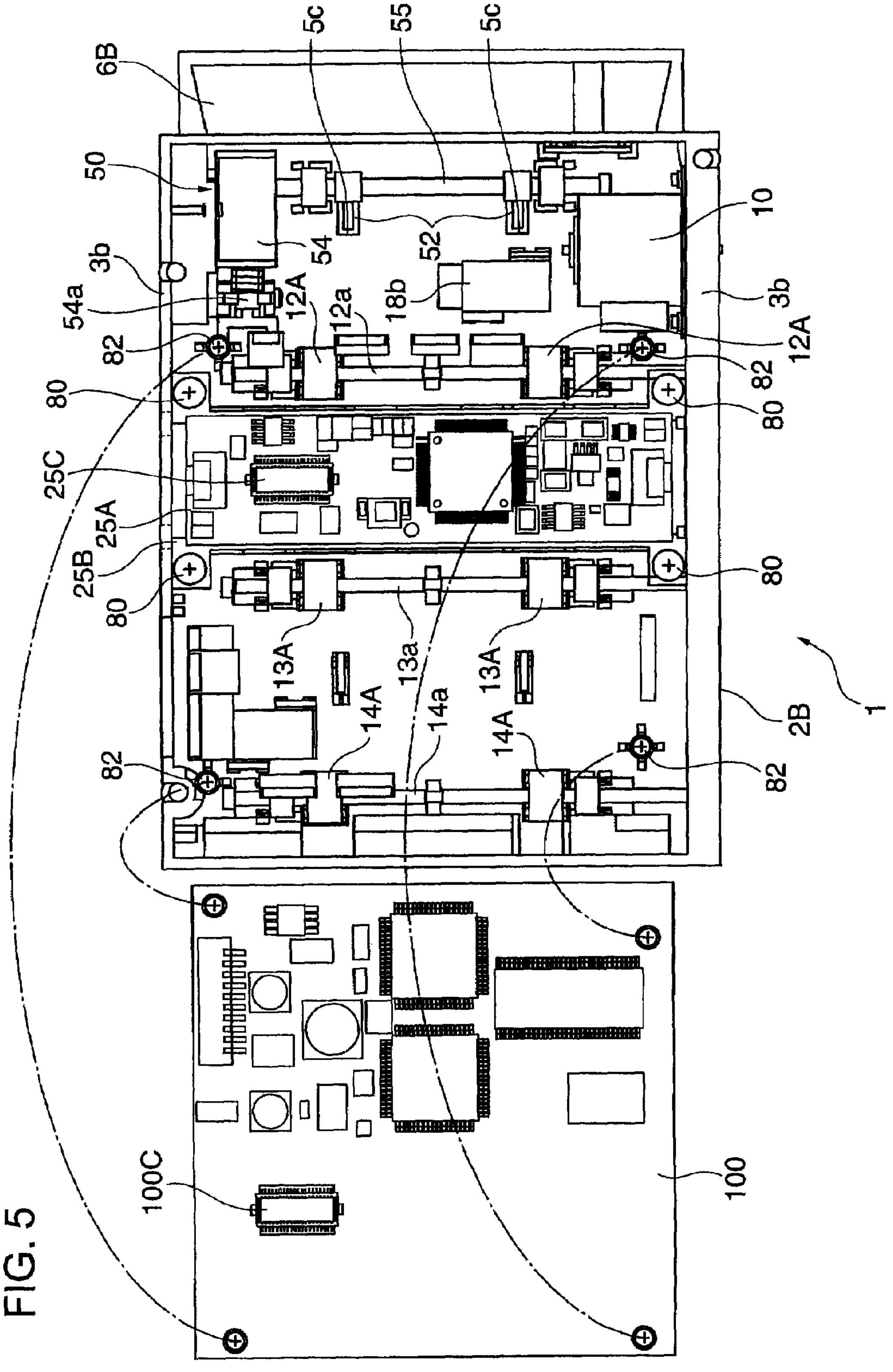
FIG. 5 is another rear elevational view of the lower frame, showing a state where a control board is to be installed.
Figure 6:
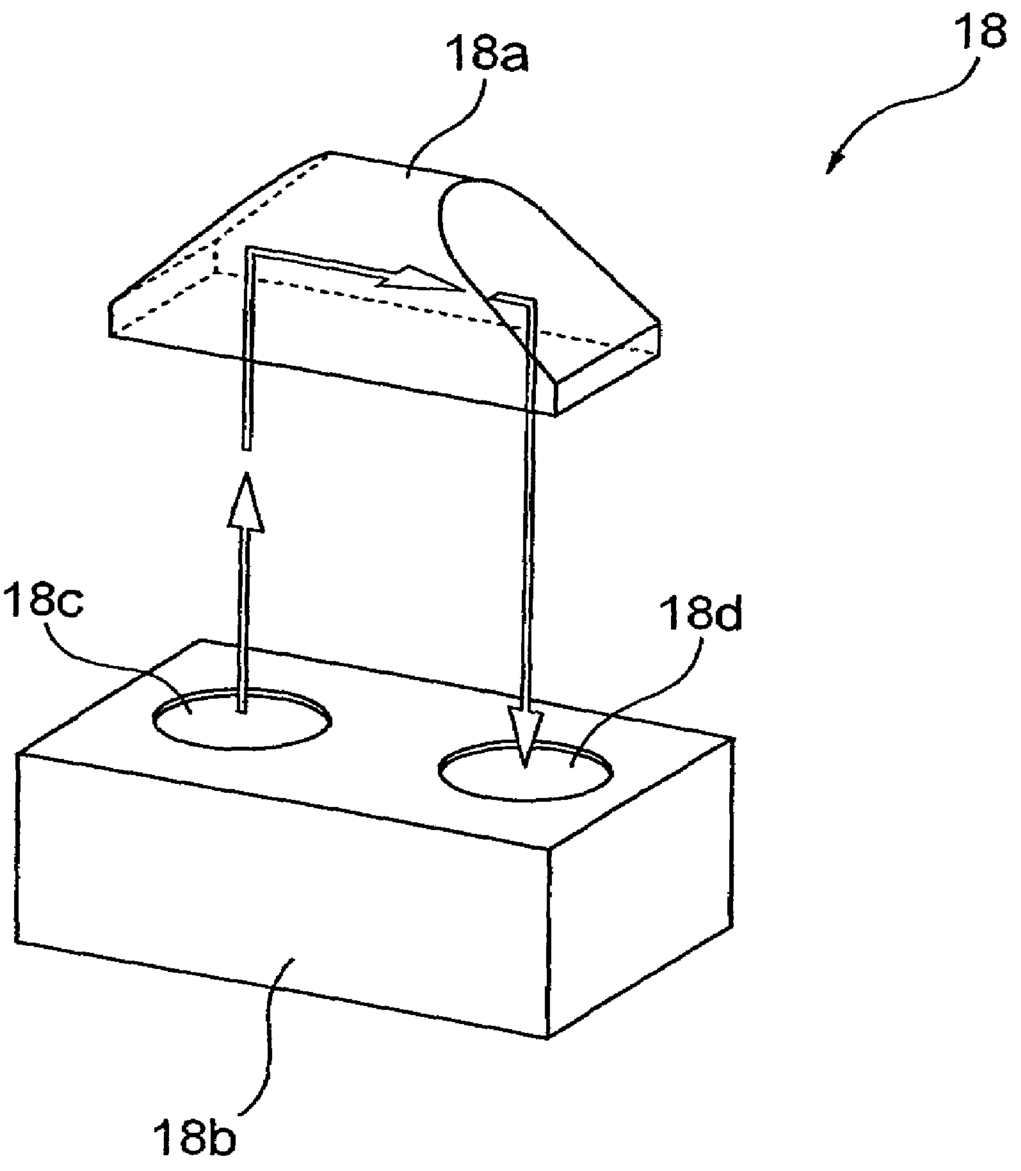
FIG. 6 is a perspective view showing a configuration of a bill detecting sensor.
Figure 7:
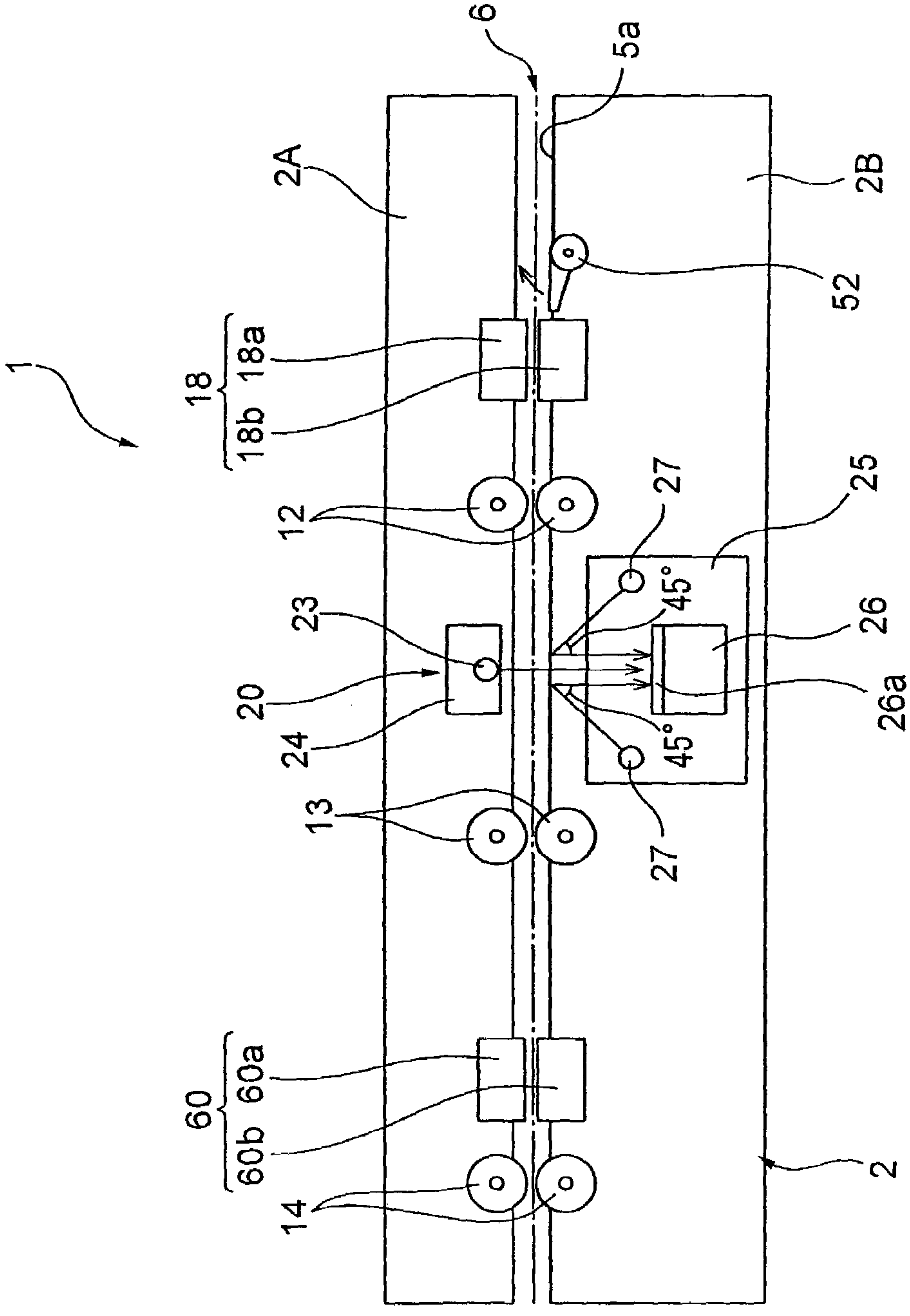
FIG. 7 is a view schematically showing the configuration of the bill handling apparatus.

FIGS. 1 to 5 are views showing a configuration of a bill handling apparatus according to this embodiment, FIG. 1 is a perspective view showing an entire configuration, FIG. 2 is a perspective view showing a state where an upper frame is opened with respect to a lower frame, FIG. 3 is a plan view showing a bill feeding path portion of the lower frame, FIG. 4 is a rear elevational view of the lower frame, and FIG. 5 is another rear elevational view of the lower frame, showing a state where a control board is to be installed.

A bill handling apparatus 1 of this embodiment is configured to be capable of being incorporated into a game media lending apparatus (not shown) installed among various kinds of game machines such as, for example, slot machines and the like. In this case, the game media lending apparatus may be provided with another apparatus (for example, a bill storage unit, coin identifying apparatus, storage media processing apparatus, power supply apparatus and the like) on the upper or lower side of the bill handling apparatus 1, and the bill handling apparatus 1 may be formed integrally with the other apparatus, or formed separately. Then, when a bill is inserted in such a bill handling apparatus 1 and the validity of the inserted bill is judged, the processing corresponding to the bill value is performed such as the processing for lending game media, the processing of writing in a storage medium such as a prepaid card, or like.

The bill handling apparatus 1 is provided with a frame 2 formed in the shape of a substantially cuboid, and the frame 2 is mounted to a locking portion of the game media lending apparatus not shown in the figure. The frame 2 has a lower frame 2B as a base side and an upper frame 2A openable/closable with respect to the lower frame 2B to cover the lower frame 2B. The frames 2A and 2B are configured to be opened and closed with a base portion as a turn center as shown in FIG. 2.

The lower frame 2B has the shape of a substantially cuboid, and is provided with a bill feeding face 3*a* for feeding a bill, and side wall portions 3*b* formed on the opposite sides of the bill feeding face 3*a*. Meanwhile, the upper frame 2A is configured in the shape of a plate provided with a bill feeding face 3*c*, and when the upper frame 2A is closed to enter between the side wall portions 3*b* on the opposite sides of the lower frame 2B, a clearance (bill feeding path) 5 to feed a bill is formed between opposite portions of the bill feeding face 3*a* and bill feeding face 3*c*.

Then, the upper frame 2A and lower frame 2B are respectively provided with bill insertion portions 6A and 6B adapted to the bill feeding path 5. These bill insertion portions 6A and 6B form a bill insertion slot 6 in the shape of a slit when the upper frame 2A and lower frame 2B are closed, and as shown in FIG. 1, a bill M is inserted inside from a shorter side of the bill along the direction of allow A.

Further, a lock shaft 4 capable of locking in the lower frame 2B is disposed on the front end side of the upper frame 2A. The lock shaft 4 is provided with an operation portion 4*a*, and by operating the operation portion 4*a* to rotate against the biasing force of a biasing spring 4*b*, rotates on a pivot P as a center to release the lock state of the upper frame 2A and lower frame 2B (the state where the frames are closed: overlapping state).

In the lower frame 2B are provided a bill feeding mechanism 8, a bill detecting sensor 18 that detects a bill inserted in the bill insertion slot 6, bill reading means 20 that is installed on the downstream side of the bill detecting sensor 18 and that reads information of the bill in a fed state, a shutter mechanism 50 that is installed in the bill feeding path 5 between the bill insertion slot 6 and the bill detecting sensor 18 and that is driven to block the bill insertion slot 6, and control means (circuit control board) 100 for controlling driving of structural members such as the aforementioned bill feeding mechanism 8, bill reading means 20, shutter mechanism 50 and the like, while identifying (performing authentication judgment processing) the validity of the read bill.

The bill feeding mechanism 8 is a mechanism capable of feeding the bill inserted from the bill insertion slot 6 along the insertion direction A, while feeding back the bill in an insertion state toward the bill insertion slot 6. The bill feeding mechanism 8 is provided with a driving motor 10 that is a driving source installed on the lower frame 2B side, and feeding roller pairs 12, 13 and 14 which are driven to rotate by the driving motor 10 and disposed in the bill feeding path 5 at predetermined intervals along the bill feeding direction.

The feeding roller pair 12 is provided with driving rollers 12A disposed on the lower frame 2B side, and pinch rollers 12B disposed on the upper frame 2A side to come into contact with the driving roller 12A. These driving rollers 12A and pinch rollers 12B are installed in two respective locations at predetermined intervals along the direction perpendicular to the bill feeding direction. These driving rollers 12A and pinch rollers 12B are exposed at their parts to the bill feeding path 5.

The driving rollers 12A installed in two respective positions are fixed to a driving shaft 12*a* rotatably supported by the lower frame 2B, and the two pinch rollers 12B are rotatably supported by a spindle 12*b* supported by the upper frame 2A. In this case, a biasing member 12*c* for biasing the spindle 12*b* to the driving shaft 12*a* side is provided in the upper frame 2A, and brings the pinch rollers 12B into contact with the driving roller side 12A by predetermined pressure.

In addition, as in the roller pair 12, the feeding roller pairs 13 and 14 are respectively comprised of two driving rollers 13A, 14A fixed to driving shafts 13*a*, 14*a*, and two pinch rollers 13B, 14B rotatably supported by spindles 13*b*, 14*b*, and the pinch rollers 13B, 14B are brought into contact with the driving rollers 13A, 14A by biasing members 13*c*, 14*c*, respectively.

The feeding roller pairs 12, 13 and 14 are driven in synchronization with one another by a driving force conveying mechanism 15 coupled to the driving motor 10. The driving force conveying mechanism 15 is comprised of a gear train disposed rotatably on one side wall portion 3*b* of the lower frame 2B. More specifically, the mechanism 15 is formed of the gear train having an output gear 10*a* fixed to an output shaft of the driving motor 10, input gears 12G, 13G and 14G which are sequentially engaged in the output gear 10*a* and mounted on the end portions of the driving shafts 12*a*, 13*a* and 14*a*, respectively and idle gears 16 installed between the gears.

According to the above-mentioned configuration, when the driving motor 10 is driven forward, each of the feeding roller pairs 12, 13 and 14 is driven to feed the bill in the insertion direction A, while when the driving motor 10 is driven reversely, being driven reversely to send the bill back to the bill insertion slot side.

The bill detecting sensor 18 is to generate a detection signal in detecting a bill inserted in the bill insertion slot 6, and in this embodiment, is installed between rotating pieces constituting the shutter mechanism described later, and the bill reading means 20 for reading the bill. The bill detecting sensor 18 is comprised of, for example, an optical type sensor, more specifically, a regression reflective photosensor, and as shown in FIG. 5, formed of a prism 18*a* installed on the upper frame 2A side and a sensor body 18*b* installed on the lower frame 2B side. More specifically, the prism 18*a* and sensor body 18*b* are arranged in such a manner that light emitted from a light-emitting portion 18*c* of the sensor body 18*b* is detected by a light-receiving portion 18*d* of the sensor body 18*b* thorough the prism 18*a*. When a bill is passed through the bill feeding path 5 positioned between the prism 18*a* and sensor body 18*b* and the light is not detected in the light-receiving portion 18*d*, the sensor 18 generates a detection signal.

In addition, the bill detecting sensor 18 may be comprised of a mechanical type sensor, as well as the optical type sensor.

On the downstream side of the bill detecting sensor 18 is installed the bill reading means 20 for reading the bill information on the bill in a fed state. The bill reading means 20 is only required to have a configuration for irradiating the bill with the light to read the bill information when the bill is fed by the bill feeding mechanism 8, and generating a signal to enable the validity (authentication) of the bill to be judged, and in this embodiment, is configured to perform readout of the bill by applying the light from the opposite sides, and detecting the transmitted light and reflected light by a light-receiving device such as a photodiode or the like. Then, the optical signal on the read bill information undergoes photoelectric transformation, and is compared with the beforehand stored data of the authorized bill in the bill identifying section, and the authentication of the fed bill is thus judged.

On the downstream side of the bill insertion slot 6 is disposed the shutter mechanism 50 that blocks the bill insertion slot 6. The shutter mechanism 50 is configured to be normally in a state for opening the bill insertion slot 6, closed when a bill is inserted and the bill detecting sensor 18 detects a rear end of the bill (the bill detecting sensor 18 is OFF), and thus prevent fraud and the like.

More specifically, the shutter mechanism 50 has the rotating pieces 52 that are rotatably driven to appear at predetermined intervals in the direction perpendicular to the bill feeding direction in the bill feeding path 5, and a solenoid (pull-type) 54 that is a driving source that rotatably drives the rotating pieces 52. In this case, the rotating pieces 52 are installed in two locations in the width direction of a spindle 55, and long holes 5*c* extending in the bill feeding direction are formed in the bill feeding face 3*a* of the lower frame 2B constituting the bill feeding path 5 to cause respective rotating pieces 52 to appear.

Further, on the downstream side of the bill reading means 20 is provided a bill passage detecting sensor 60 that detects passage of the bill. The bill passage detecting sensor 60 is to generate a detection signal when the bill judged as being valid is further fed to the downstream side, and the sensor 60 detects the rear end of the bill. Based on the occurrence of the detection signal, the energization of the solenoid 54 is released (the solenoid is OFF), and the driving shaft 54*a* moves in the protruding direction by the biasing force of the biasing spring provided in the driving shaft 54*a*. By this means, the rotating pieces 52 constituting the shutter mechanism are rotatably driven to open the bill feeding path via the spindle 55 synchronized with the driving shaft 54*a*.

The bill passage detecting sensor 60 is, as in the bill detecting sensor 18, comprised of an optical type sensor (regression reflective photosensor), and formed of a prism 60*a* installed on the upper frame 2A side and a sensor body 60*b* installed on the lower frame 2B side. Naturally, the bill passage detecting sensor 60 may be comprised of a mechanical type sensor, as well as the optical type sensor.

In the vicinity of the bill insertion slot 6 is provided an informing device that informs that the bill is being inserted in a visible manner. Such an informing device can be comprised of, for example, an LED 70 that blinks, is lit when a user inserts a bill in the bill insertion slot 6, and informs the user of the bill being handled. It is thereby possible to prevent the user from erroneously inserting a next bill.

Referring to FIGS. 2 to 5 and 7, described below is the configuration of the bill reading means 20 installed in the upper frame 2A and lower frame 2B.

The bill reading means 20 has a light-emitting unit 24 provided with a first light-emitting portion 23 that is disposed on the upper frame 2A side and that is capable of emitting slit-shaped light over the feeding path width direction on the upper side of the fed bill, and a line sensor 25 disposed on the lower frame 2B side.

The line sensor 25 installed on the lower frame 2B side has a light-receiving portion 26 disposed opposite to the first light-emitting portion 23 in a manner of sandwiching the bill, and second light-emitting portions 27 that are disposed adjacent to opposite sides of the light-receiving portion 26 on the bill feeding direction and that are capable of emitting slit-shaped light.

The first light-emitting portion 23 disposed opposite to the light-receiving portion 26 of the line sensor 25 functions as a light source for transmission. As shown in FIG. 2, the first light-emitting portion 23 is formed as the so-called light guide member 23*b* made of a synthetic resin formed in the shape of a rectangle rod, and preferably, has functions of receiving emitted light from the light-emitting device 23*a* such as an LED and the like installed at the end portion, and emitting the light while guiding the light along the longitudinal direction. By this means, it is possible to apply the slit-shaped light uniformly to the entire region in the width direction of the feeding path of the fed bill with a simple configuration.

In addition, the light-receiving portion 26 of the line sensor 25 is disposed in the shape of a line in parallel with the first light-emitting portion 23 that is the light guide member, and formed in the shape of a thin plate which extends in the direction of intersecting the bill feeding path 5, and which is formed in the shape of a band having a width to the extent of not affecting the sensitivity of a light-receiving sensor, not shown, provided in the light-receiving portion 26. More specifically, the portion 26 has a configuration where a plurality of CCDs (Charge Coupled Device) is provided in the shape of a line in the center in the thickness direction of the light-receiving portion 26, and a Selfoc lens array 26*a* is arranged in the shape of a line in a position above the CCDs to gather the transmitted light and reflected light.

The second light-emitting portions 27 of the line sensor 25 function as light sources for reflection. As shown in FIG. 3, each of the second light-emitting portions 27 is formed, as in the first light-emitting portion 23, as the so-called light guide member 27*b* made of a synthetic resin formed in the shape of a rectangle rod, and preferably, has functions of receiving emitted light from the light-emitting device 27*a* such as an LED and the like installed at the end portion, and emitting the light while guiding the light along the longitudinal direction. By this means, it is possible to apply the slit-shaped light uniformly to the entire region in the width direction of the feeding path of the fed bill with a simple configuration.

In addition, each of the second light-emitting portions 27 is capable of applying the light to the bill at an elevation angle of 45 degrees, and is disposed so that the reflected light from the bill is received in the light-receiving portion 26 (light-receiving sensor). In this case, the light emitted from the second light-emitting portion 27 is input to the light-receiving portion 26 at an angle of 45 degrees, but the incident angle is not limited to 45 degrees, and can be set as appropriate in ranges capable of reliably receiving the reflected light. Therefore, an arrangement of the second light-emitting portions 27 and second light-receiving portion 26 can be modified in design as appropriate corresponding to the configuration of the bill handling apparatus. Further, the second light-emitting portions 27 are installed on the opposite sides with the light-receiving portion 26 sandwiched therebetween to emit the light from the opposite sides respectively at an angle of 45 degrees. This is because when a tear, crease and the like are present on the bill surface and the light is applied to a concavo-convex portion caused by a portion of the tear, crease or the like from only one side, a shaded area may be caused in the concavo-convex portion by shielding the light. Therefore, by emitting the light from the opposite sides, it is possible to prevent the concavo-convex portion from being darkened, and to obtain image data with higher accuracy than in emission from one side. Naturally, the second light-emitting portion 27 may be configured to be installed on only one side.

The line sensor 25 is exposed to the bill feeding path 5, and is thereby provided with concavo-convex portions 25*a*, as shown in FIG. 2, on opposite ends of its surface portion (that is substantially the same plane as the feeding face 3*a*) in the bill feeding direction to catch the fed bill hardly. Further, as in the line sensor 25, the light emitting unit 24 is provided with concavo-convex portions 24*a*, as shown in FIG. 2, on opposite ends of its surface portion in the bill feeding direction to catch the fed bill hardly.

The line sensor 25 is provided with the second light-emitting portions 27 extending in the width direction of the bill feeding path and the light-receiving portion 26, and is mounted on a sensor board 25A installed with a circuit that causes the second light-emitting portions 27 to emit light, a detecting circuit that detects the light incident upon the CCDs provided in line-shape to constitute the light-receiving portion 26, an amplifier that amplifies an output of the detecting circuit, an A/D converter that converts the amplified output signal into a digital signal, a control section that controls these kinds of devices, and the like. The sensor board 25A is attached to a hold frame 25B in the shape of a substantially rectangle.

The sensor board 25A is electrically connected to a control board 100 that controls the entire apparatus. In this case, both the boards are arranged opposite to each other as shown in FIGS. 4 and 5, and the sensor board 25A is fixed to a predetermined position in the lower frame 2B by screwing screws 80 into screw holes respectively formed in four corner portions of the hold frame 25B, while being attached to the hold frame 25B. Meanwhile, the control board 100 is fixed to a predetermined position in the lower frame 2B by screwing screws 82 into screw holes respectively formed in four corner portions, while causing a predetermined clearance with the sensor board 25A.

The sensor board 25A and control board 100 are respectively provided with the first connector 25C and second connector 100C to electrically connect both the boards. The connectors 25C and 100C are concave and convex connectors protruding in the perpendicular direction to the board plane to be fitted with each other in installing both the boards, and more specifically, are comprised of stacking connectors so as to increase the number of connection poles. In other words, with the sensor board 25A fixed to the predetermined position of the lower frame 2B, the second connector 100C of the control board 100 is fitted into the first connector 25C of the sensor board 25A, the control board 100 is fixed to the lower frame 2B in this state, and both the connectors are thereby electrically connected.

Figure 8:
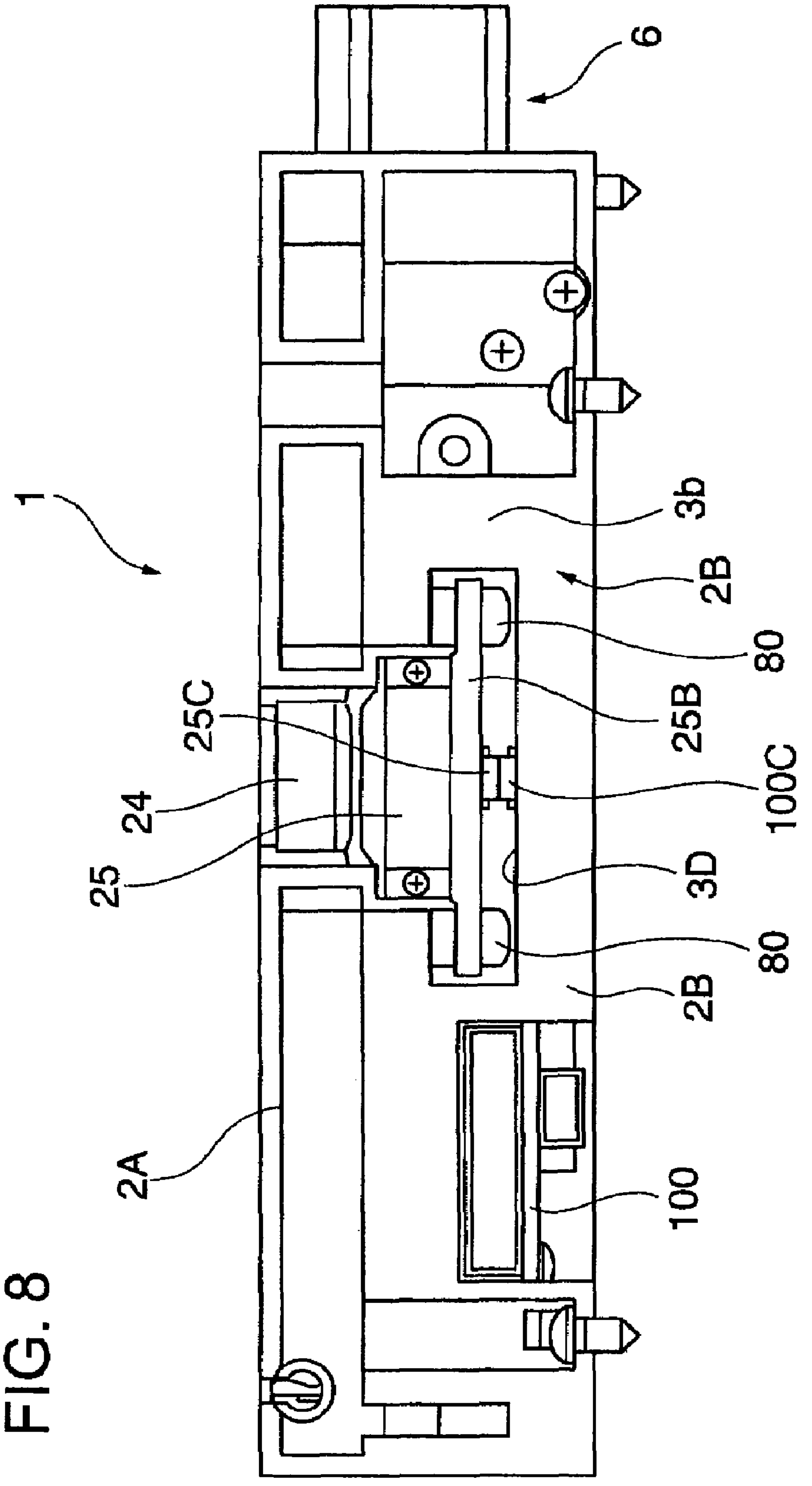
FIG. 8 is a side elevational view of the bill handling apparatus.
Figure 9:
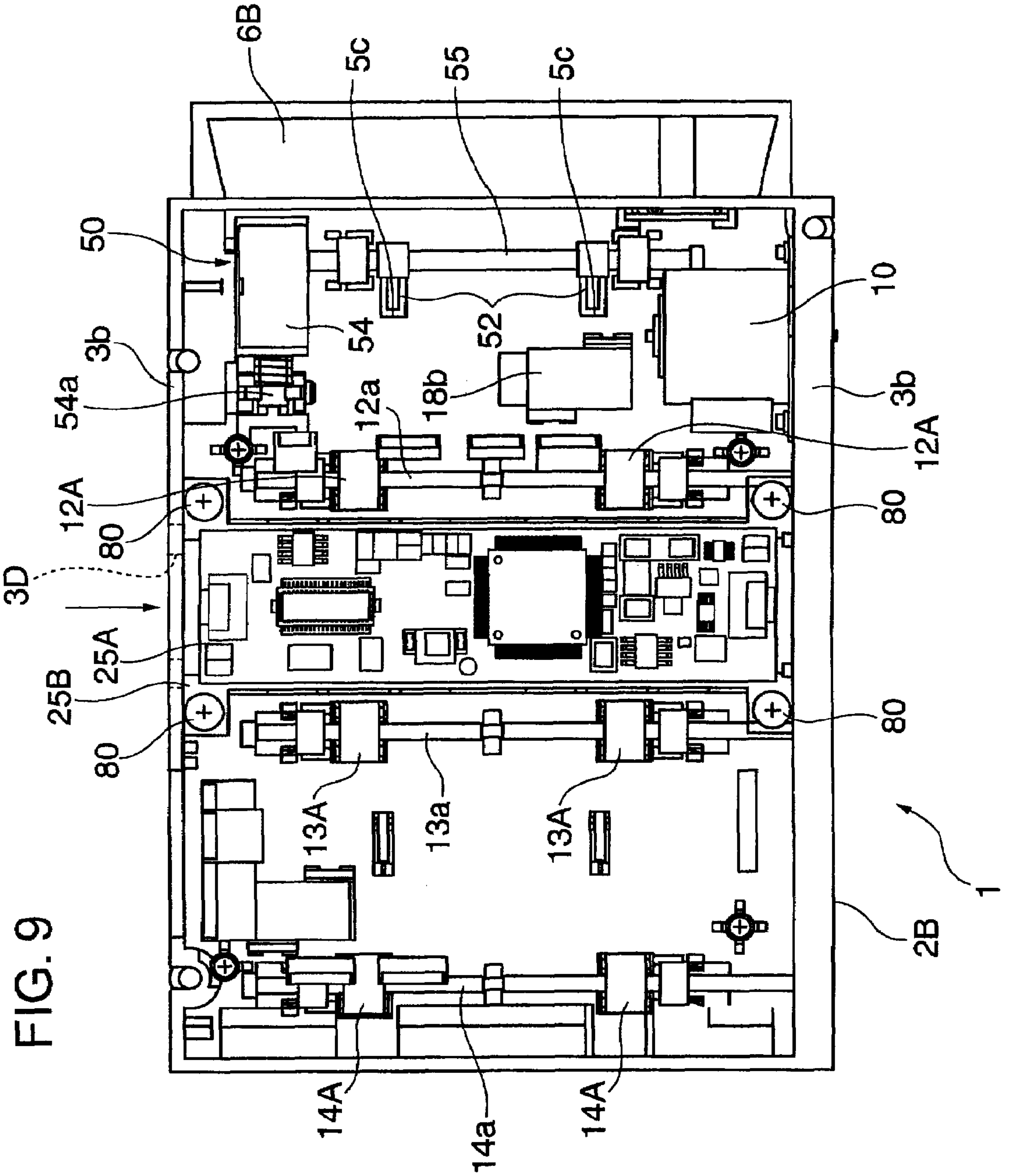
FIG. 9 is another rear elevational view of the lower frame, showing a state where the control board is removed.
Figure 10:
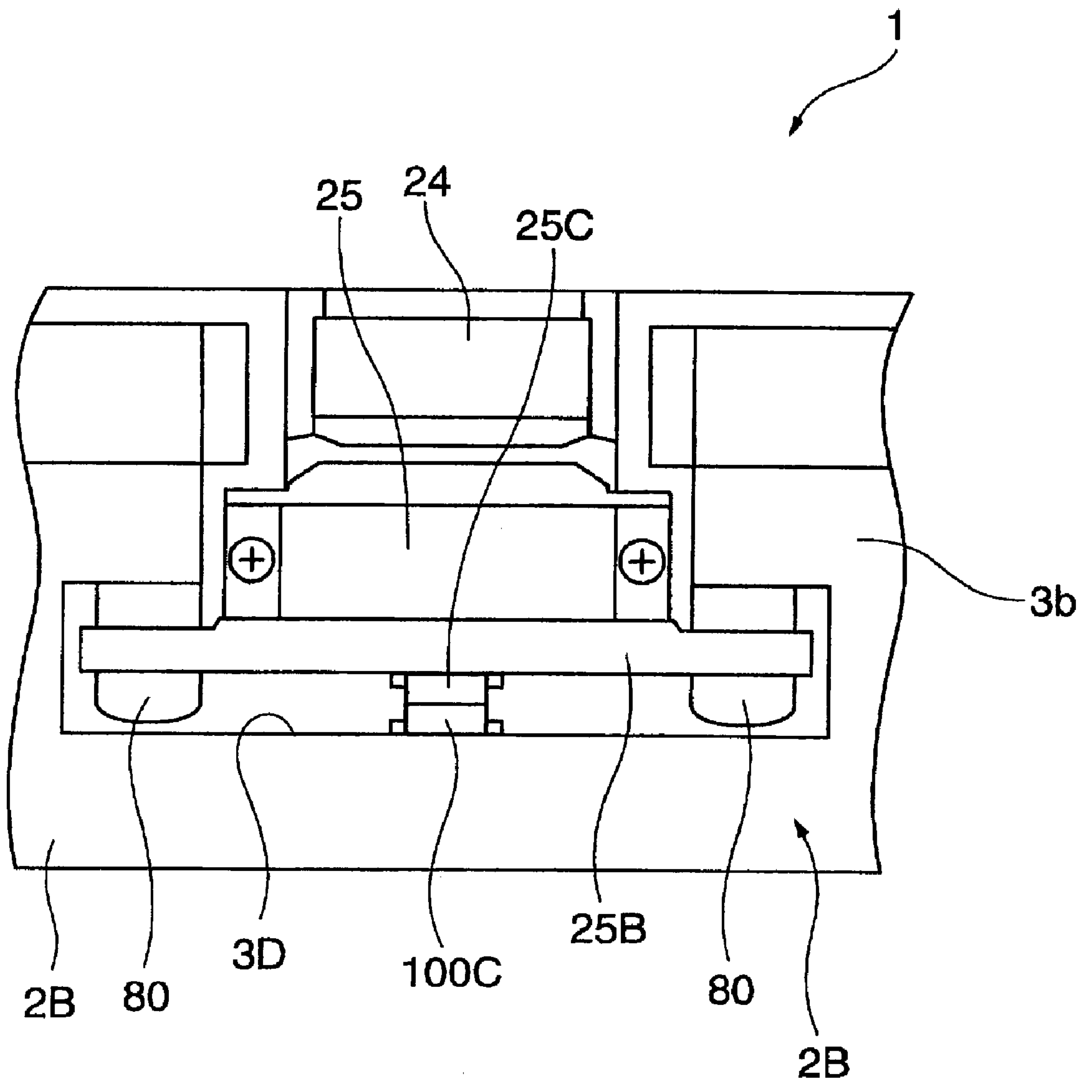
FIG. 10 is another side elevational view of the bill handling apparatus, showing an enlarged view of an opening portion.

In addition, in the above-mentioned configuration, an opening 3D is formed in the side wall portion 3*b* constituting the frame so that the line sensor 25 slides into the opening and is capable of being installed inside. This opening 3D is configured in a similar shape to that of the side face portion of the sensor board 25A installed with the line sensor 25, and as shown in FIG. 8, is formed in a substantially convex shape. In other words, it is made possible to cause the sensor board 25A installed with the line sensor 25 to slide to be installed in a predetermined position of the lower frame 2B, as shown by the arrow in FIG. 9, through the opening 3D while being attached to the hold frame 25B in the shape of a substantially rectangle. Then, the size of the opening 3D is configured to enable the connection state of the first connector 25C and the second connector 100C to be visually identified as shown in FIG. 10, in electrically connecting the sensor board 25A and control board 100.

Figure 11:
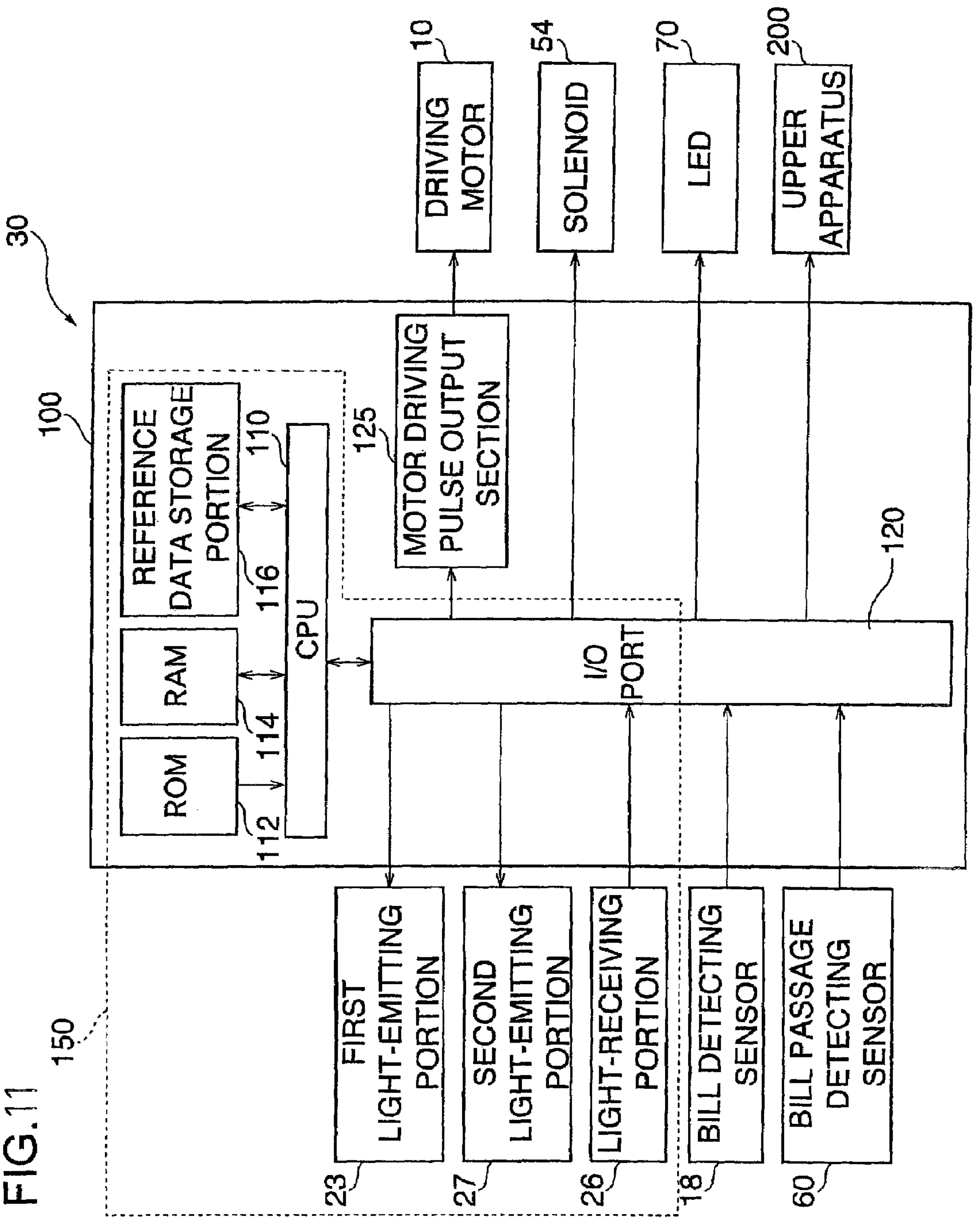
FIG. 11 is a block diagram illustrating a control system of the bill handling apparatus.

FIG. 11 is a block diagram illustrating a schematic configuration of the control means for controlling the bill handling apparatus 1 provided with the bill feeding mechanism 8, bill reading means 20, shutter mechanism 50 and the like.

The control means 30 is provided with the control board 100 for controlling the operation of each driving apparatus as described above. On the control board 100 are mounted a CPU (Central Processing Unit) 110 for controlling driving of each driving apparatus while constituting the bill identifying section, ROM (Read Only Memory) 112, RAM (Random Access Memory) 114 and a reference data storage section 116.

The ROM 112 stores operation programs for driving apparatuses such as the driving motor 10, solenoid 54, LED 70 and the like, various kinds of programs such as an authentication judgment program and the like, and permanently data. The CPU 110 operates according to the programs stored in the ROM 112, inputs and outputs signals to/from the driving apparatuses as described above via an I/O port 120, and controls the operation of the bill handling apparatus. In other words, the CPU 110 is connected to a driving motor driving circuit 125 (driving motor 10), solenoid 54, and LED 70 via the I/O port 120. The driving apparatuses are controlled in operation by control signals from the CPU 110 according to the operation programs stored in the ROM 112. Further, the CPU 110 receives a detection signal from the bill detecting sensor 18, and a detection signal from the bill passage detecting sensor 60 via the I/O port 120, and based on these detection signals, controls forward/reverse driving of the driving motor 10, blinking of the LED 70, and driving of the solenoid 54.

The RAM 114 stores the data and programs used for the CPU 110 to operate, and acquires the received light data of a bill targeted for judgment to temporarily store. The data is compared with the reference data stored in the reference data storage section 116, and the authentication judgment processing is thereby performed. In addition, in this embodiment, the reference data is stored in the dedicated reference data storage section 116, but may be stored in the ROM 112. Further, although the reference data of the genuine bill may be stored beforehand in the reference data storage section 116, for example, the genuine bill is fed through the bill feeding mechanism 8 to acquire the received light data, and the data may be stored as the reference data.

Further, the CPU 110 is connected to the first light-emitting portion (light guide member) 23 in the light-emitting unit 24, and the light-receiving portion 26 and second light-emitting portions (light guide members) 27 in the line sensor 25 via the I/O port 120. These portions constitute a bill authentication judgment section 150 together with the CPU 110, ROM 112, RAM 114 and reference data storage section 116, and control the operations required from the authentication judgment in the bill handling apparatus 1.

Furthermore, the CPU 110 is connected to a control section of the game media lending apparatus into which the bill handling apparatus 1 is incorporated, and an upper apparatus 200 such as a host computer and the like of an external apparatus, via the I/O port 120, and transmits various kinds of signals (such as information of the bill, alarm signal and the like) to the upper apparatus.

According to the bill handling apparatus configured as described above, when the bill detecting sensor 18 detects insertion of a bill and becomes ON, the driving motor 10 is forward driven, and the LED 70 is lit. The feeding roller pairs 12, 13 and 14 are thereby driven to rotate in the bill insertion direction to feed the bill inside the apparatus, and the user is notified of the bill being handled to prevent insertion of an additional bill.

The bill is fed inside the apparatus, the bill reading means 20 thereby reads the information, and the control means 30 executes the authentication judgment processing. At this point, in this embodiment, when the bill detecting sensor 18 detects the rear end of the bill (the bill detecting sensor 18 is OFF), the solenoid 54 is energized, and the rotating pieces 52 are thereby driven to rotate and block the bill insertion slot 6.

When the bill is judged as being genuine in the above-mentioned authentication judgment processing, the bill is further fed to the downstream side. At this point, to be able to support money-back processing and the like that would occur due to some reason, the processing for causing the bill to temporarily wait may be performed. Then, in the stage where the rear end of the bill further fed to the downstream side is detected by the bill passage detecting sensor 60, the driving of the driving motor 10 is halted. With the halt, the driving of the solenoid 54 is made OFF (energization is canceled) to withdraw the rotating pieces 52 from the bill feeding path 5, the bill insertion opening 6 is opened, and the LED 70 is extinguished.

In addition, when the bill is judged being not genuine in the above-mentioned authentication judgment processing, the processing for driving the driving motor 10 reversely is executed in this stage, the shutter mechanism 50 is opened, and the bill is sent back toward the bill insertion opening side. In this send-back processing, in the stage where the rear end of the bill is detecting by the bill detecting sensor 18, the LED 70 is extinguished.

In the bill handling apparatus 1 configured as described above, the sensor board 25A installed with the line sensor 25 for reading the bill is connected electrically to the control board 100 side by the first connector and second connector (stacking connectors) when arranged opposite to the control board 100 without through the relay harness unlike in the conventional apparatus, the need is thereby eliminated of providing unnecessary occupied space between both the boards, and it is possible to miniaturize the bill handling apparatus 1. In other words, the need is eliminated of providing a clearance (to the extent that the relay harness does not come into contact with the boards and mounted parts) corresponding to the relay harness in between both the board, the boards can be brought into closer to each other corresponding to the eliminated clearance, and it is thereby possible to miniaturize the entire apparatus.

Further, in the above-mentioned configuration, the opening 3D is formed in the side wall portion 3*b* of the lower frame 2B to enable the line sensor 25 and sensor board 25A to be slid and installed therein and further enable the first connector 25C and second connector 100C to be identified visually, and it is made possible to easily perform the operating for electrically connecting the sensor board 25A to the control board 100.

In addition, it is preferable that the first connector 25C and second connector 100C are installed in the positions near the opening 3D as close as possible, in other words, in the positions enabling the connection state to be visually identified with ease.

In such as configuration, since the connection part of the connectors can be visually identified, it is possible to connect the connectors between the control board 100 and the sensor board 25A with easy, and since the connector parts are installed in a portion near the opening 3D, it is possible to prevent dust from entering from the opening 3D. Further, both the boards can be seen hardly from the opening 3D, and it is thus possible to improve security.

In the foregoing, the embodiment of the invention is described, but it is a feature of the invention making electrical connection between the sensor board of the sensor constituting the bill reading means and the control board for controlling the entire apparatus by the first connector and the second connector without using the relay harness unlike in the conventional apparatus, and the other configurations are capable of being modified as appropriate. For example, the configuration and arrangement pattern of the reading means (sensor) for reading a bill, method of reading the bill, method of performing the bill authentication judgment processing and the like are not limited to the above-mentioned embodiment, and are capable of being carried into practice with various modifications thereof.

The bill handling apparatus of the invention is capable of being incorporated into various kinds of apparatuses that provide products and/or service by inserting a bill, while being not limited to a game media lending apparatus. Further, this embodiment describes the apparatus for handling bills as an example, but the invention is applicable to apparatuses for making an authentication judgment on gold certificates, securities and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A bill handling apparatus, comprising:

a line sensor disposed along a direction transverse to a bill feeding path, the line sensor being configured to read a bill fed on the bill feeding path;

a sensor board configured to mount the line sensor on one face and a first connector on another face;

a control board configured to mount a second connector, which is configured to connect to the first connector on the sensor board, on a flat face of the control board; and a side wall extending in a direction parallel to the bill feeding path, wherein a predetermined opening is formed on the side wall, the first and second connectors are comprised of stacking connectors configured to electrically connect the sensor board and the control board, and are mounted on the sensor board and the control board so as to be positioned in proximity to the opening of the side wall, when the sensor board and the control board are disposed inside the apparatus, a surface of the line sensor is exposed to the bill feeding path, when the sensor board is disposed at a predetermined position inside of the apparatus by being inserted via the opening of the side wall, the control board is electrically connected and opposed to the sensor board inside the apparatus while the first and second connectors connected to each other are sandwiched therebetween, when the second connector is connected to the first connector of the sensor board disposed inside of the apparatus; and the opening of the side wall, which is configured to receive the sensor board into the apparatus, is formed so that a connection state between the first connector of the sensor board disposed inside the apparatus and the second connector of the control board is externally visible through the opening.

* * * * *